United States Patent
Openshaw (10) Patent No.: US 8,162,329 B1
(45) Date of Patent: Apr. 24, 2012

(54) MATERIAL TRANSPORTER

(76) Inventor: Paul Openshaw, Manchester (GB)

( * ) Notice: Subject to any disclaimer, the term of this patent is extended or adjusted under 35 U.S.C. 154(b) by 0 days.

(21) Appl. No.: 12/948,827

(22) Filed: Nov. 18, 2010

(51) Int. Cl.
 *B62B 1/26* (2006.01)
(52) U.S. Cl. .................................. 280/47.131; 280/79.7
(58) Field of Classification Search .................. 280/43.1, 280/47.11, 47.131, 47.19, 47.33, 63, 79.11, 280/79.7; 414/11, 444
 See application file for complete search history.

(56) References Cited

U.S. PATENT DOCUMENTS

| | | | | |
|---|---|---|---|---|
| 848,837 | A * | 4/1907 | Marz | 269/133 |
| 1,103,486 | A * | 7/1914 | Cobb | 280/47.131 |
| 2,579,448 | A * | 12/1951 | Carrera | 280/35 |
| 2,816,771 | A * | 12/1957 | Hunt | 280/47.131 |
| 3,090,635 | A * | 5/1963 | Masterson, Jr. | 280/47.131 |
| 3,717,357 | A * | 2/1973 | Schaefer | 280/35 |
| 3,765,550 | A | 10/1973 | Tausheck | |
| 3,841,651 | A | 10/1974 | Bigney | |
| 3,845,969 | A * | 11/1974 | Nadeau | 280/47.131 |
| 3,871,054 | A * | 3/1975 | Schaefer | 29/267 |
| D245,595 | S * | 8/1977 | Johnson | D34/26 |
| 4,270,741 | A * | 6/1981 | Hurst | 269/17 |
| 4,666,184 | A * | 5/1987 | Garvey, Jr. | 280/814 |
| 4,695,067 | A * | 9/1987 | Willey | 280/47.22 |
| 4,917,124 | A * | 4/1990 | Reasor | 134/120 |
| D310,894 | S | 9/1990 | Smith | |
| 5,048,850 | A * | 9/1991 | McDonald | 280/47.131 |
| D340,337 | S | 10/1993 | Beasley | |
| 5,284,410 | A | 2/1994 | Sare et al. | |
| 5,288,090 | A | 2/1994 | Bross | |
| 5,294,099 | A * | 3/1994 | Dalfino | 269/133 |
| 5,318,316 | A * | 6/1994 | Shurtleff | 280/79.7 |
| 5,340,153 | A * | 8/1994 | Parker | 280/814 |
| 5,899,650 | A * | 5/1999 | Collins | 414/10 |
| 5,924,832 | A * | 7/1999 | Rice | 414/23 |
| 6,264,184 | B1 | 7/2001 | Armstrong et al. | |
| 6,478,315 | B1 * | 11/2002 | Manesis | 280/37 |
| 6,663,123 | B1 * | 12/2003 | Kovacs | 280/79.7 |
| 6,866,274 | B1 | 3/2005 | Muscat | |
| 6,886,821 | B2 * | 5/2005 | Eberle, III | 269/133 |
| 6,961,976 | B2 * | 11/2005 | Kuo | 280/79.11 |
| 7,111,851 | B2 * | 9/2006 | Duncan | 280/47.26 |
| D550,921 | S | 9/2007 | McMorris | |
| 2002/0134418 | A1 * | 9/2002 | Kozak | 135/905 |
| 2003/0002957 | A1 | 1/2003 | Etheredge | |
| 2004/0188966 | A1 * | 9/2004 | Kline | 280/79.11 |

* cited by examiner

*Primary Examiner* — John R Olszewski
*Assistant Examiner* — Brodie Follman
(74) *Attorney, Agent, or Firm* — Montgomery Patent & Design, LLC; Robert C. Montgomery; Joseph T. Yaksich (57) ABSTRACT

An apparatus to aid in the moving and transportation of heavy doors or large sheet-type materials comprises a pair of joined "L"-shaped brackets mounted upon a folding hinge. The hinge allows the weight of the carried material to fold the apparatus inwardly thus securely gripping the loaded items within. Each "L"-shaped bracket comprises a front plate which secures the load in a lower corner area while allowing the user to lift and support the other bottom corner. The apparatus is supported via two (2) wheel assemblies each supported by separate axles. To use the apparatus, a door is placed with its forward corner in the apparatus. The rear portion of the door is then lifted and balanced by the user while being pushed where the door is needed. The low profile design of the apparatus allows the load to be transported through narrow hallways or doorways.

18 Claims, 5 Drawing Sheets

MATERIAL TRANSPORTER

RELATED APPLICATIONS

The present invention was first described in a notarized Official Record of Invention on Jul. 22, 2009, that is on file at the offices of Montgomery Patent and Design, LLC, the entire disclosures of which are incorporated herein by reference.

FIELD OF THE INVENTION

The present invention relates generally to dollies, and in particular, to a device specially adapted to help a single user transport large, flat materials such as drywall, doors, and the like.

BACKGROUND OF THE INVENTION

Movement of tools and materials around a construction site or similar project site often represents a substantial portion of the time and effort required to complete a project. While some smaller and lighter objects can be transported by hand, objects of difficult shape and weight require multiple persons or special tools or equipment for transportation.

In particular, objects such doors and sheet materials are difficult to transport due to the fact that they are large in at least one (1) dimension. This can result in frustration and wasted labor costs since the moving of such objects requires a level of coordination, navigation, and effort disproportionate to the weight of the objects. In addition, many common transportational tools such as dollies and the like are not well suited to moving objects with such dimensions. This can cause undue difficulty in maneuvering such objects in narrow hallways, for example.

Various attempts have been made to provide dolly devices for doors and similarly dimensioned materials. Examples of these attempts can be seen by reference to several U.S. Pat. No. 3,841,651, issued in the name of Bigney, describes a hand truck adapted to receive sheet materials with a locking bar for retaining the materials during transport.

U.S. Pat. No. 5,284,410, issued in the name of Sare et al., describes a sheet material carrying device comprising a "U"-shaped frame which receives an edge of a sheet material. The Sare device provides wheels to allow a user to push the sheet material along a ground surface.

U.S. Pat. No. 5,288,090, issued in the name of Bross, describes a door dolly which provides engagement for a lower corner of a door or similarly shaped object while providing a handled rolling means to a single user for transport of the object.

U.S. Pat. No. 6,264,184, issued in the name of Armstrong et al., describes a wheeled door carrier with a vice mechanism which aids a single user in the transport and hanging of a door or similar panel object.

U.S. Pat. No. 6,866,274, issued in the name of Muscat, describes an article transport dolly for sheet materials which provides a wheeling means including a non-slip surface and braking features.

Additionally, ornamental designs for a door or sheet material dolly exist, particularly U.S. Pat. Nos. D 310,894; D 340,337; and D 550,921. However, none of these designs are similar to the present invention.

While these devices fulfill their respective, particular objectives, each of these references suffer from one (1) or more of the aforementioned disadvantages. Many such devices are themselves bulky, making for difficult in storing and transporting the device during periods of non-use. Also, many such devices do not adequately secure the transported materials which can cause dislodging when experiencing bumps or the like. Furthermore, many such devices only allow transport of the materials in one particular spatial orientation which can make fitting and maneuvering the carried objects difficult in narrow spaces. In addition, many such devices are not easily resizable and adjustable to secure accommodate varying thicknesses or amounts of doors or sheet materials. Accordingly, there exists a need for a door and sheet material transporter without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide a compact, simple device which aids a single user in the transport of large, flat objects such as doors and sheet materials in a manner which is quick, adjustable, and readily maneuverable. Thus, the object of the present invention is to solve the aforementioned disadvantages and provide for this need.

To achieve the above objectives, it is an object of the present invention to aid in moving and transporting heavy flat objects such as doors and large sheet materials. The apparatus comprises a pair of "L"-shaped brackets each with an independent wheel portion. The two (2) halves are attached via a folding hinge.

Another object of the present invention is to provide secure gripping to an object placed in the apparatus. The weight of the object collapses the hinge inwardly to provide a clamping gripping means to a contained object.

Yet still another object of the present invention is to allow for maneuvering through narrow hallways or similarly obstructive passages. The apparatus retains a front corner of a door or similar object such that a user lifts and pushes from a rear corner of the object, allowing the user to pivot the object in an up and down manner to navigate a path.

Yet still another object of the present invention is to allow easy insertion of an object into the apparatus bracket in a manner which does not damage the object. The wall portions of each bracket assembly comprise a curved profile which provides a secure clamping function with a curved top edge to prevent scratching and the like during insertion.

Yet still another object of the present invention is to provide strength to the retaining bracket assemblies via a plurality of integrally molded linear stiffeners located within wall and base plate portions of each bracket assembly.

Yet still another object of the present invention is to allow the bracket assemblies to pivot both toward and away from each other in order to selectively accommodate objects of varying thickness. Each bracket assembly is connected to an independent wheel axle and wheel in order to allow separate motioning of each side of the apparatus. The apparatus can accommodate large loads via outward motioning of the brackets while still maintaining a clamping force on the load.

Yet still another object of the present invention is to comprise a small semi-circular handle which allows a user to easily carry the apparatus when not loaded.

Yet still another object of the present invention is to provide a method of utilizing the device that provides a unique means of obtaining the apparatus, transporting it to a desired location for use via the carrying handle, opening the brackets to a desired width, loading the apparatus with a front corner portion of a door, sheet material, or similarly large, flat object or plurality of objects, automatically securing and clamping the objects via their weight and the inward collapsing motion of the hinge, manually lifting a rear corner of the loaded object or objects, pushing the objects along a ground surface and maneuvering manually around narrow passages and the like, unloading the objects upon reaching a desired destination, and transporting the apparatus via the handle and subsequently storing the apparatus during periods of non-use.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 material transporter
20 first retaining bracket assembly
22 first wall
24 first base plate
26 first stiffener feature
28 hinge element
29 hinge pin
30 second retaining bracket assembly
32 second wall
34 second base plate
36 second stiffener feature
40 wheel
42 axle
44 retaining washer
46 cotter pin
48 hub feature
50 first front plate
52 fastener aperture
55 second front plate
60 handle
80 fastener
100 door
110 sheet material
120 ground surface

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a material transporter (herein described as the "apparatus") 10, which aids in moving and transporting heavy flat objects such as doors 100, large sheet-type materials 110, or the like. The apparatus 10 comprises a pair of "L"-shaped brackets attached to each other via a folding hinge 28. The hinge 28 allows a weight of the carried materials 100, 110 to collapse the hinge 28 inwardly thus securely gripping the door 100 or sheet material 110. The apparatus 10 also comprises a pair of front plates 50, 55, thereby forming a four-sided captivating structure around a front corner area of the door 100 or sheet material 110. The apparatus 10 transports the door 100 or sheet material 110 using two (2) strong supporting wheel portions 40, each having an independent axle 42.

Figure 1:
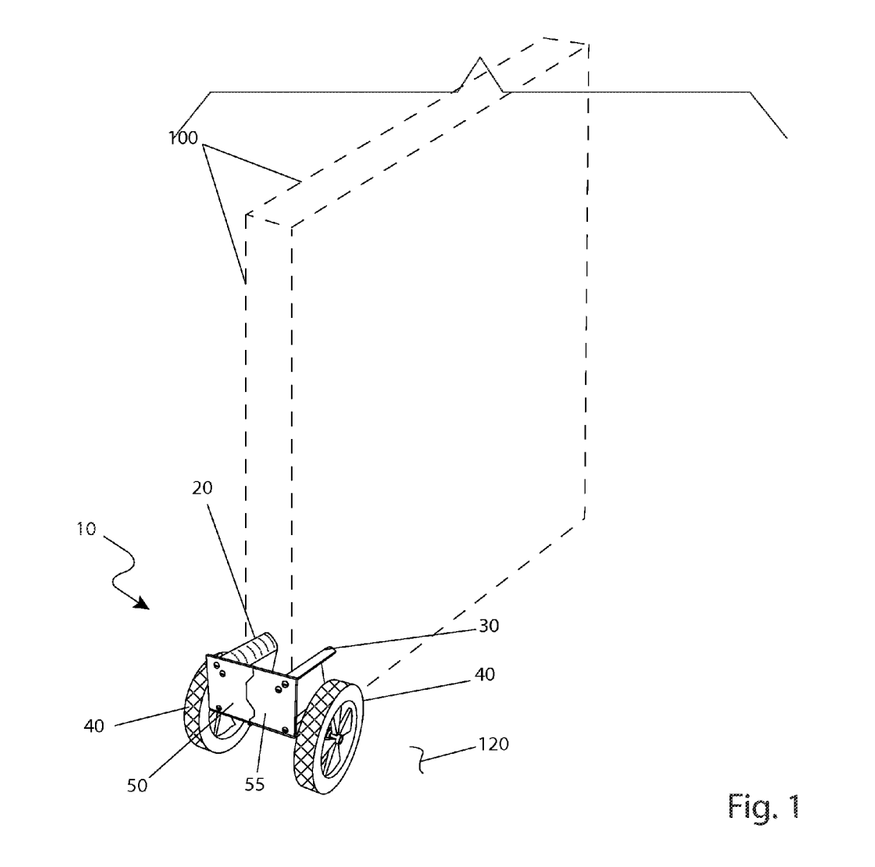
FIG. 1 is a front perspective environmental view of a material transporter 10 depicting an in-use state, according to a preferred embodiment of the present invention.

Referring now to FIG. 1, a front perspective view of the apparatus 10 depicting an in-use state, according to a preferred embodiment of the present invention, is disclosed. The apparatus 10 comprises a first retaining bracket assembly 20, a second retaining bracket assembly 30, a first front plate 50, a second front plate 55, and a pair of wheels 40. The retaining bracket assemblies 20, 30 and the attached front plates 50, 55 form a four-sided enclosing structure to securely position a front lower corner of a vertically orientated door 100 or piece of sheet material 110. In use, the front corner of the door 100 or sheet material 110 is placed into the apparatus 10 while a user lifts and pushes a rear corner portion of said door 100 or sheet material 110 along a ground surface 120, thereby providing easy passage through narrow hallways or doorways.

Figure 2A:
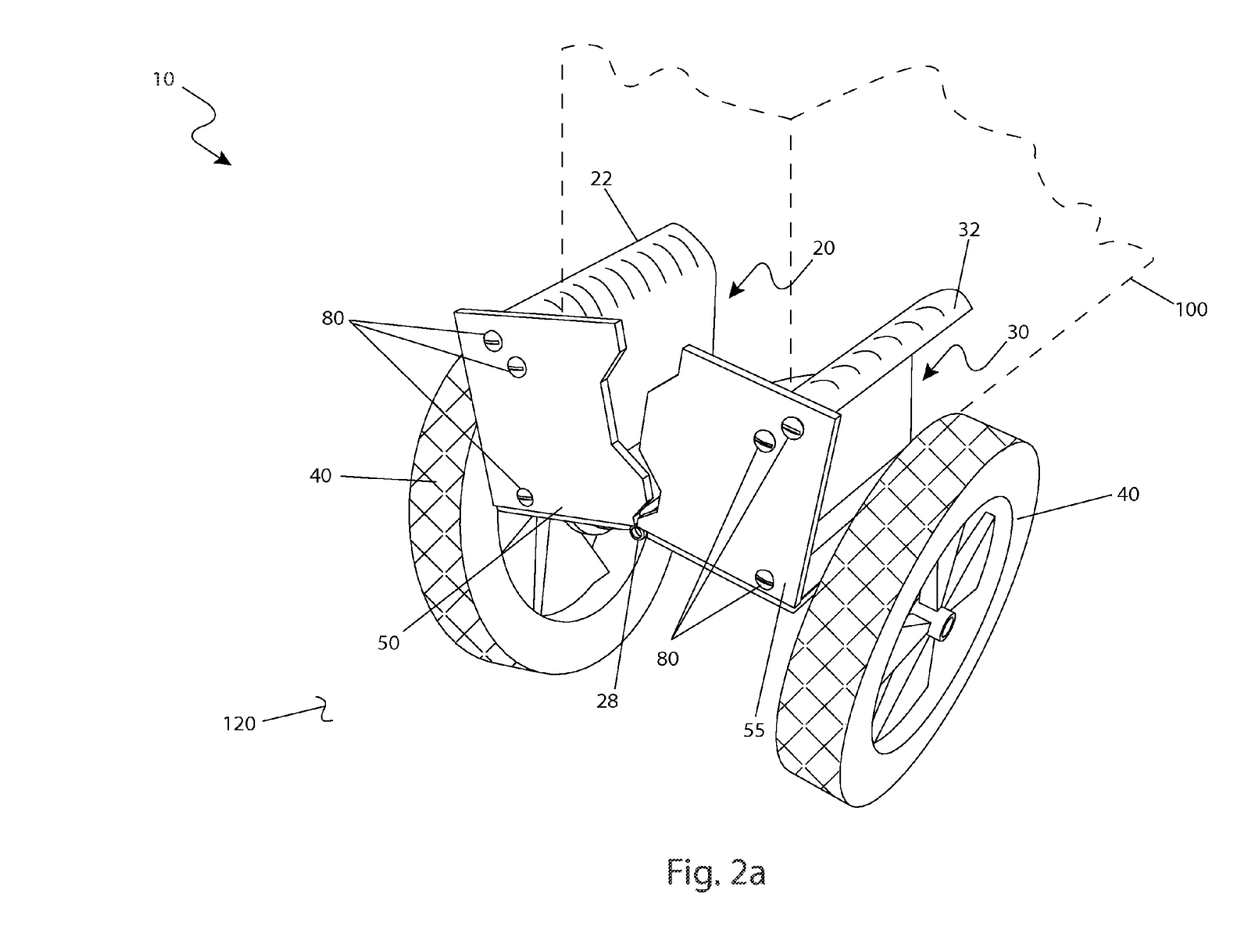
FIG. 2a is a close-up front view of the material transporter 10, according to a preferred embodiment of the present invention.
Figure 2B:
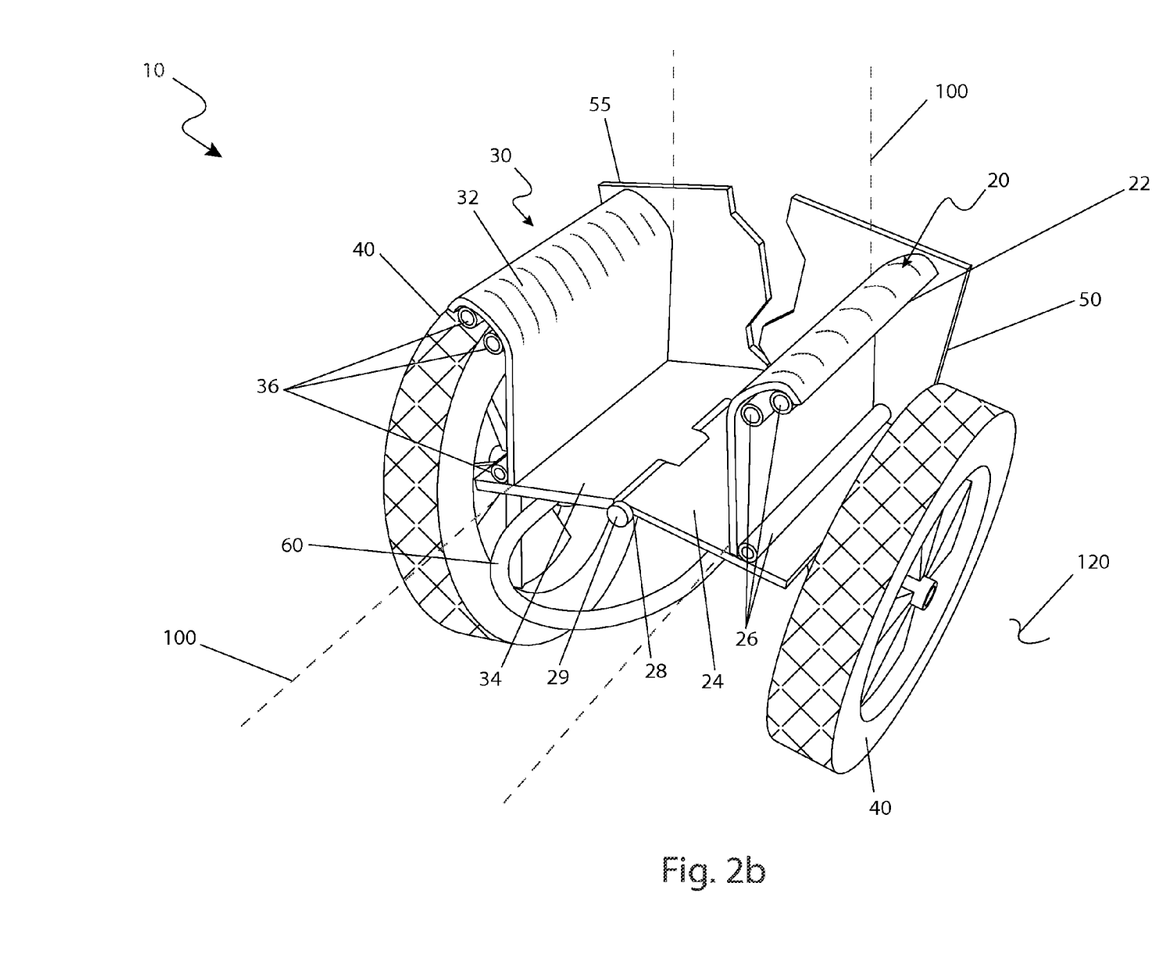
FIG. 2b is a close-up rear view of the material transporter 10, according to a preferred embodiment of the present invention.
Figure 3:
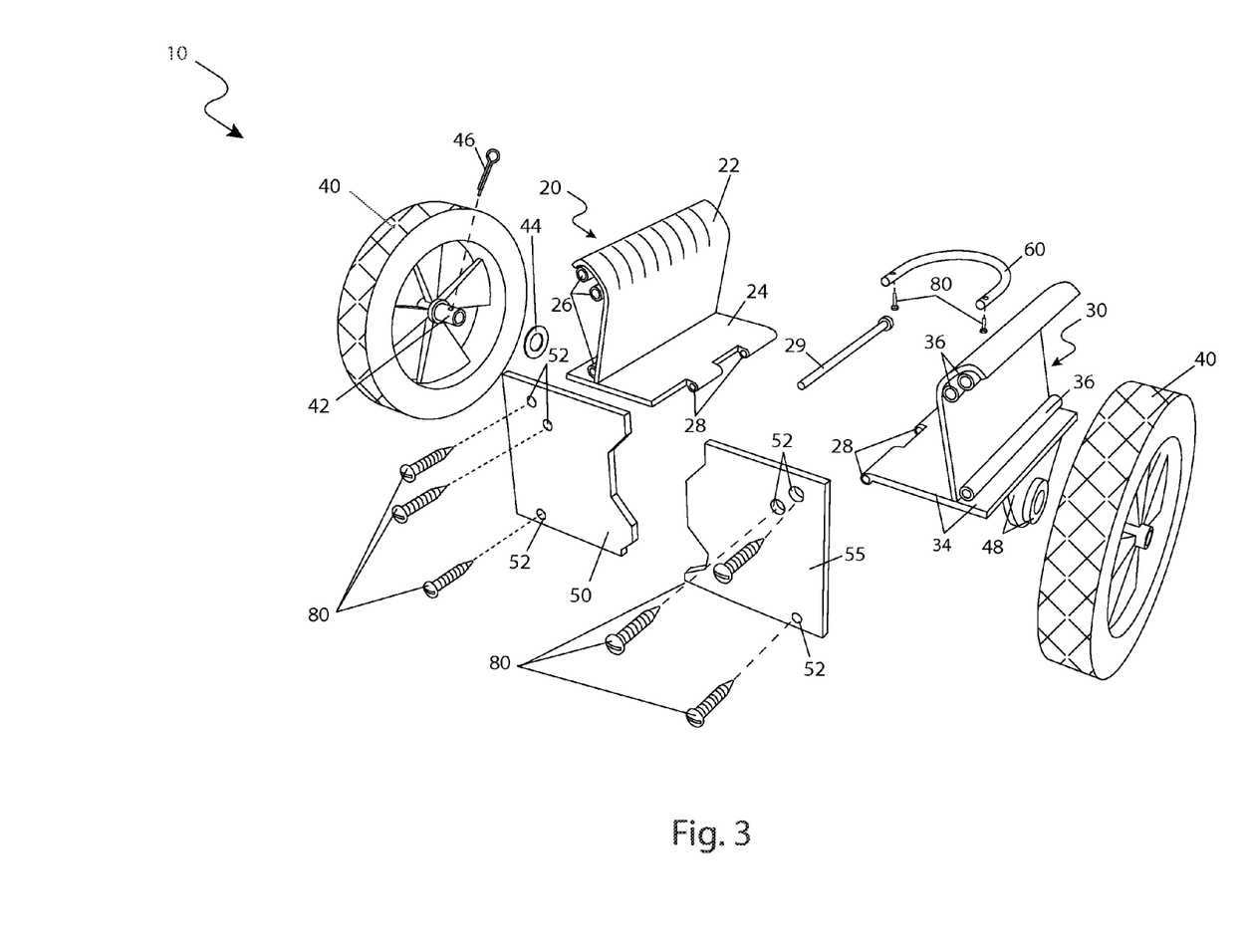
FIG. 3 is an exploded view of the material transporter 10, according to a preferred embodiment of the present invention; and, FIG. 4 is a front perspective view of the material transporter 10 depicting transportation of multiple sheets of plywood 110, according to a preferred embodiment of the present invention.

Referring now to FIGS. 2a, 2b, and 3, front, rear, and exploded views of the apparatus 10, according to a preferred embodiment of the present invention, are disclosed. The apparatus 10 provides a collapsing structure to secure a front bottom corner of a door 100 or piece of sheet material 110 within.

The apparatus 10 comprises a one-piece first retaining bracket assembly 20 further comprising a first wall 22, a first base plate 24, and three (3) first stiffeners 26. Said first wall 22, first base plate 24, and first stiffeners 26 comprise a single rigid plastic part being manufactured in a molding or extruding process; however, said portions 22, 24, 26 may also be made using a rugged metal material being welded together with equal benefit and as such should not be interpreted as a limiting factor of the apparatus 10. The wall portion 22 extends upwardly from the horizontal first base plate portion 24 at an angle of approximately ten degrees (10°) from a vertical plane. Said wall portion 22 leans inwardly toward a center portion of the apparatus 10 and gently curves outwardly along a top edge, thereby allowing easy entry of said door 100 or piece of sheet material 110 without scratching.

The apparatus 10 further comprises a second retaining bracket assembly 30 comprising a second wall 32, a second base plate 34, and three (3) second stiffeners 36. The second retaining bracket assembly 30 comprises a minor image of the previously described first retaining bracket assembly 20, incorporating similar materials and functions as described. The first 20 and second 30 retaining bracket assemblies are affixed thereto each other and able to pivot towards each other via an axial hinge device 28 located along an adjacent inward edge of the first 24 and second 34 base plates and extending between said assemblies 20, 30 in a linear fashion. The hinge 28 is secured by inserting a round hinge pin 29 through a central opening in a conventional manner. The inwardly pivoting motion of the first 22 and second 32 wall portions provide a clamping means thereto the included door 100 or piece of sheet material 110 as the weight of said door 100 or sheet material 110 is applied downwardly upon the first 24 and second 34 base plate portions, causing the first 22 and second 32 wall portions to correspondingly rotate inwardly.

The first 20 and second 30 retaining bracket assemblies are further strengthened by a plurality of integrally-molded first 26 and second 36 stiffeners. Said stiffeners 26, 36 are molded into respective first 22 and second 22 wall portions and first 24 and second 34 base plate portions and horizontally disposed in a parallel manner to said base plate portions 24, 34. Said stiffeners 26, 36 comprise linear tubular elements providing hollow centers to receive a fastener 80 into such as a self-tapping screw. Said stiffeners 26, 36 provide an attachment means thereto the first 50 and second 55 front plates comprising integral fastener aperture portions 52 being correspondingly positioned relative to said stiffeners 26, 36. Said first 50 and second 55 front plates are fastened to the stiffener portions 26, 36 of the respective first 20 and second 30 retaining bracket assemblies along forward edge regions using common fasteners 80 such as screws. The front plates 50, 55 also act as a forward stopping surface to position the transported door 100 or sheet material 110. Said first 50 and second 55 front plates comprise adjacent contacting edges designed to protrude and interlock with each other to distribute a load from the door 100 or sheet material 110 equally upon both front plates 50, 55. The front plates 50, 55 are envisioned to be made of similar materials as the retaining bracket assemblies 20, 30.

Each retaining bracket assembly 20, 30 comprises an integral axle hub feature 48 along a respective bottom outer edge. Each hub feature 48 comprises a circular orifice approximately one (1) inch long being suitably sized to receive an axle portion 42 of a respective wheel 40 therethrough. Each assembly of the wheel 40, wheel axle 42, and the hub feature 48 provides an independent and rotating support to the respective retaining bracket assembly 20, 30, thereby allowing said retaining bracket assemblies 20, 30 to pivot freely toward or apart from each other based upon a thickness of the door 100 or the sheet material 110 being transported. The wheels 40 comprise heavy-duty plastic or metal rolling members being approximately six (6) inches in diameter and having integrally-molded axle portions 42. Said wheels 40 are envisioned to provide molded or bonded tread surfaces around a perimeter surface to improve traction across a ground surface 120. Furthermore, said wheels 40 and axles 42 are envisioned to be retained in the respective hub features 48 using a retaining washer and a cotter pin 46 or equivalent retention method.

The apparatus 10 also comprises a flexible semi-circular plastic or rubber handle 60 having end portions which enable mounting of said handle 60 to adjacent rear edges of the first 24 and second 34 base plates using common fasteners 80. Said handle 60 allows a user to easily carry the apparatus 10 in an unloaded state as needed.

Figure 4:
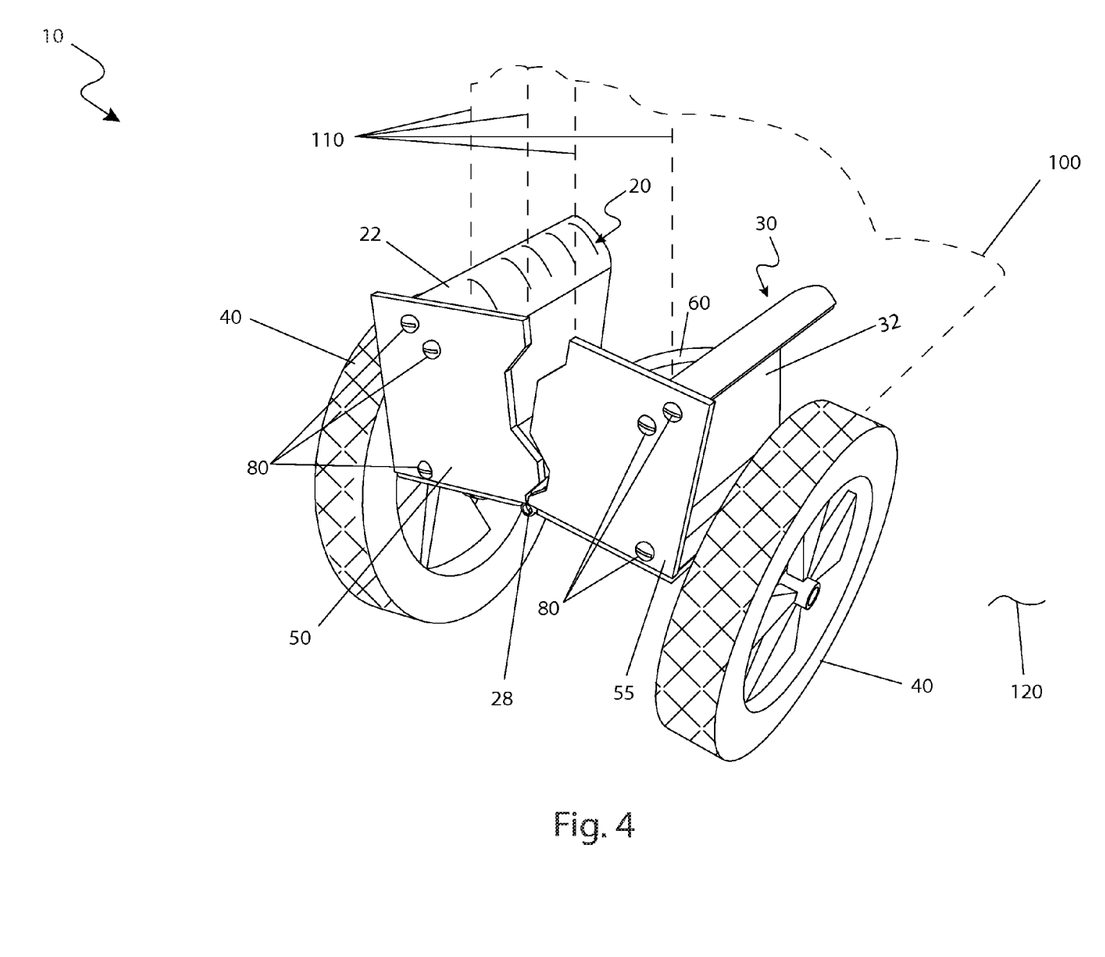

Referring now to FIG. 4, a front perspective view of the apparatus 10 depicting transportation of multiple sheets of plywood 110, according to a preferred embodiment of the present invention, is disclosed. The independent attachment of the wheels 40 to the respective retaining bracket assemblies 20, 30, and the angular motioning of the center hinge 28 allows the wall portions 22, 32 of the retaining bracket assemblies 20, 30 to pivot freely toward or apart from each other. Said motioning of the wall portions 22, 32 enables a user to load the apparatus 10 with multiple items, or extra-thick items, resulting in a varying total thickness of a load, while still maintaining a clamping force from the wall portions 22, 32 to said items 100, 110. In this manner, the apparatus 10 may transport several pieces of sheet material 110 as seen here. Furthermore, the interlocking and overlapping features of the front plates 50, 55 provide continuous support to the door 100 or sheet material 110 while the apparatus 10 is in a maximum or spread-apart state.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be utilized as indicated in FIGS. 1 and 4.

The method of assembling and utilizing the apparatus 10 may be achieved by performing the following steps: assembling the two (2) wheels 40 thereto the first 20 and second 30 retaining bracket assemblies, if not previously installed, by inserting the respective axle portions 42 through the hub features 48; retaining said wheels 40 by installing the retaining washers 44 and cotter pins 46 thereto said axle portions 42; joining the first 20 and second 30 retaining bracket assemblies together by inserting the hinge pin 29 thereinto the integral hinge 28, if not previously installed; mounting the first 50 and second 55 front plates thereto the respective first 20 and second 30 retaining bracket assemblies using the fasteners 80; loading the apparatus 10 with a door 100 or a piece of sheet material 110 by positioning a forward bottom corner of the vertically orientated door 100 or sheet material 110 between the first 22 and second 32 wall portions being positioned against the front plates 50, 55; manually lifting a rear corner of the loaded door 100 or sheet material 110 thereto a comfortable height off a ground surface 120; pushing forwardly against the door 100 or sheet material 110, thereby propelling the loaded apparatus 10 along said ground surface 120 and/or through narrow halls and doorways as needed; unloading the door 100 or sheet material 110 in a normal manner upon reaching a destination; carrying the empty apparatus 10 when not in use using the handle 60; and, benefiting from reduced effort and awkwardness associated with moving doors 100 and sheet materials 110 afforded a user of the present apparatus 10.

The apparatus 10 may be utilized to transport a plurality of pieces of sheet material 110 in like manner by allowing the first 22 and second 32 wall portions to separate a necessary distance as required to contain a desired quantity of sheet material 110; positioning forward bottom corners of said sheet material 110 between the first 22 and second 32 wall portions being positioned against the front plates 50, 55; manually lifting rear corner portions of said sheet material 110; and, transporting said sheet material 110 across a ground surface 120 as previously described.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A material transportation device, comprising:
   a unitary first bracket hingedly attached to a second bracket via a folding hinge assembly, further comprising:
      a first base plate, horizontally disposed between a first inner edge and a first outer edge;
      a first wall having a proximal end extending upwardly from said first outer edge of said first base plate at an inwardly disposed offset angle and terminating at a gently outwardly curvilinear distal end; and,
      at least one first stiffener affixed to and extending along a length of said first wall parallel to said first base plate;
   a pair of front plates, comprising a first front plate removably attached to said first bracket and a second front plate removably attached to said second bracket; and,
   a pair of wheel portions, each attached to said first bracket and said second bracket;
   wherein said folding hinge assembly is collapsed inwardly when a load is placed thereon, thereby securing said load;
   wherein said distal end of said first wall enables an ease of entry of said load;
   wherein said at least one first stiffener provides a stiffening means to said device and a fastening means for fastening said first front plate to said first bracket;
   wherein said device provides a four-sided captivating structure for at least a portion of said load; and,
   wherein said pair of wheels assists in transporting said load.

2. The device of claim 1, wherein said second bracket comprises a unitary construction, further comprising:
   a second base plate, horizontally disposed between a second inner edge and a second outer edge;
   a second wall having a proximal end extending upwardly from said second outer edge of said second base plate at an inwardly disposed offset angle and terminating at a gently outwardly curvilinear distal end; and,
   at least one second stiffener affixed to and extending along a length of said second wall parallel to said second base plate;
   wherein said distal end of said second wall enables an ease of entry of said load; and,
   wherein said at least one second stiffener provides a stiffening means to said device and a fastening means for fastening said second front plate to said second bracket.

3. The device of claim 2, wherein said angle is approximately ten degrees from a vertical plane.

4. The device of claim 2, wherein said at least one first and second stiffener each further comprises a linear tubular element having a hollow center portion for receiving a fastener.

5. The device of claim 2, wherein said folding hinge assembly further comprises:
   a first axial hinge portion, comprising an integral portion of said first inner edge of said first base plate, further comprising a pair of extending projections each having a hollow tubular receiving portion;
   a second axial hinge portion interlocking with said first axial hinge portion, comprising an integral portion of said second inner edge of said second base plate, further comprising a pair of extending projections each having a hollow tubular receiving portion;
   a hinge pin securing said first axial hinge portion to said second axial hinge portion when aligned;
   wherein said hinge pin enables said first axial hinge portion and said second axial hinge portion to inwardly pivot when said load is placed thereon.

6. The device of claim 2, wherein said pair of front plates plate further comprise adjacent contacting edges designed to protrude and interlock with each other.

7. The device of claim 2, wherein said pair of wheel portions each further comprises:
   a first wheel assembly, comprising:
      a first axle hub feature integral to a bottom surface of said first outer edge of said first base plate, comprising an aperture;
      a first wheel, comprising a resilient rolling member having a tread surface located on an outer perimeter surface; and,
      a first axle member integrally extending outwardly perpendicular from a central location of said first wheel, said first axle member insertingly received and secured to said aperture of said first axle hub feature; and,
   a second wheel assembly, comprising:
      a second axle hub feature integral to a bottom surface of said second outer edge of said second base plate, comprising an aperture;
      a second wheel, comprising a resilient rolling member having a tread surface located on an outer perimeter surface; and,
      a second axle member integrally extending outwardly perpendicular from a central location of said second wheel, said second axle member insertingly received and secured to said aperture of said second axle hub feature;
   wherein said first wheel assembly provides an independent and rotating support to said first bracket;
   wherein said second wheel assembly provides an independent and rotating support to said second bracket; and,
   wherein said pair of wheel portions comprise a resiliency enabling support to said device and said load thereupon.

8. The device of claim 7, wherein said first wheel and said second wheel each comprises a diameter of six inches.

9. A material transportation device, comprising:
   a unitary first bracket hingedly attached to a second bracket via a folding hinge assembly, further comprising:
      a first base plate, horizontally disposed between a first inner edge and a first outer edge;
      a first wall having a proximal end extending upwardly from said first outer edge of said first base plate at an inwardly disposed offset angle and terminating at a gently outwardly curvilinear distal end; and,
      at least one first stiffener affixed to and extending along a length of said first wall parallel to said first base plate;
   a pair of front plates, comprising a first front plate removably attached to said first bracket and a second front plate removably attached to said second bracket;

a flexible handle removably attached at both terminal ends to said first bracket and said second bracket opposite said pair of front plates; and, a pair of wheel portions, each attached to said first bracket and said second bracket;

wherein said folding hinge assembly is collapsed inwardly when a load is placed thereon, thereby securing said load;

wherein said device provides a four-sided captivating structure for at least a portion of said load;

wherein said distal end of said first wall enables an ease of entry of said load;

wherein said at least one first stiffener provides a stiffening means to said device and a fastening means for fastening said first front plate to said first bracket;

wherein said handle enables carrying and suspending said device; and, wherein said pair of wheels assists in transporting said load.

10. The device of claim 9, wherein said second bracket comprises a unitary construction, further comprising:

a second base plate, horizontally disposed between a second inner edge and a second outer edge;

a second wall having a proximal end extending upwardly from said second outer edge of said second base plate at an inwardly disposed offset angle and terminating at a gently outwardly curvilinear distal end; and, at least one second stiffener affixed to and extending along a length of said second wall parallel to said second base plate;

wherein said distal end of said second wall enables an ease of entry of said load; and, wherein said at least one second stiffener provides a stiffening means to said device and a fastening means for fastening said second front plate to said second bracket.

11. The device of claim 10, wherein said angle is approximately ten degrees from a vertical plane.

12. The device of claim 10, wherein said at least one first and second stiffener each further comprises a linear tubular element having a hollow center portion for receiving a fastener.

13. The device of claim 10, wherein said folding hinge assembly further comprises:

a first axial hinge portion, comprising an integral portion of said first inner edge of said first base plate, further comprising a pair of extending projections each having a hollow tubular receiving portion;

a second axial hinge portion interlocking with said first axial hinge portion, comprising an integral portion of said second inner edge of said second base plate, further comprising a pair of extending projections each having a hollow tubular receiving portion;

a hinge pin securing said first axial hinge portion to said second axial hinge portion when aligned;

wherein said hinge pin enables said first axial hinge portion and said second axial hinge portion to inwardly pivot when said load is placed thereon.

14. The device of claim 10, wherein said pair of front plates plate further comprise adjacent contacting edges designed to protrude and interlock with each other.

15. The device of claim 10, wherein said pair of wheel portions each further comprises:

a first wheel assembly, comprising:

a first axle hub feature integral to a bottom surface of said first outer edge of said first base plate, comprising an aperture;

a first wheel, comprising a resilient rolling member having a tread surface located on an outer perimeter surface; and, a first axle member integrally extending outwardly perpendicular from a central location of said first wheel, said first axle member insertingly received and secured to said aperture of said first axle hub feature; and, a second wheel assembly, comprising:

a second axle hub feature integral to a bottom surface of said second outer edge of said second base plate, comprising an aperture;

a second wheel, comprising a resilient rolling member having a tread surface located on an outer perimeter surface; and, a second axle member integrally extending outwardly perpendicular from a central location of said second wheel, said second axle member insertingly received and secured to said aperture of said second axle hub feature;

wherein said first wheel assembly provides an independent and rotating support to said first bracket;

wherein said second wheel assembly provides an independent and rotating support to said second bracket; and, wherein said pair of wheel portions comprise a resiliency enabling support to said device and said load thereupon.

16. The device of claim 15, wherein said first wheel and said second wheel each comprises a diameter of six inches.

17. The device of claim 10, wherein said handle is removably attached to a bottom surface of said first bracket and said second bracket.

18. The device of claim 17, wherein said handle further comprises a having a semi-circular plastic or rubber construction.

* * * * *